Figure 5:
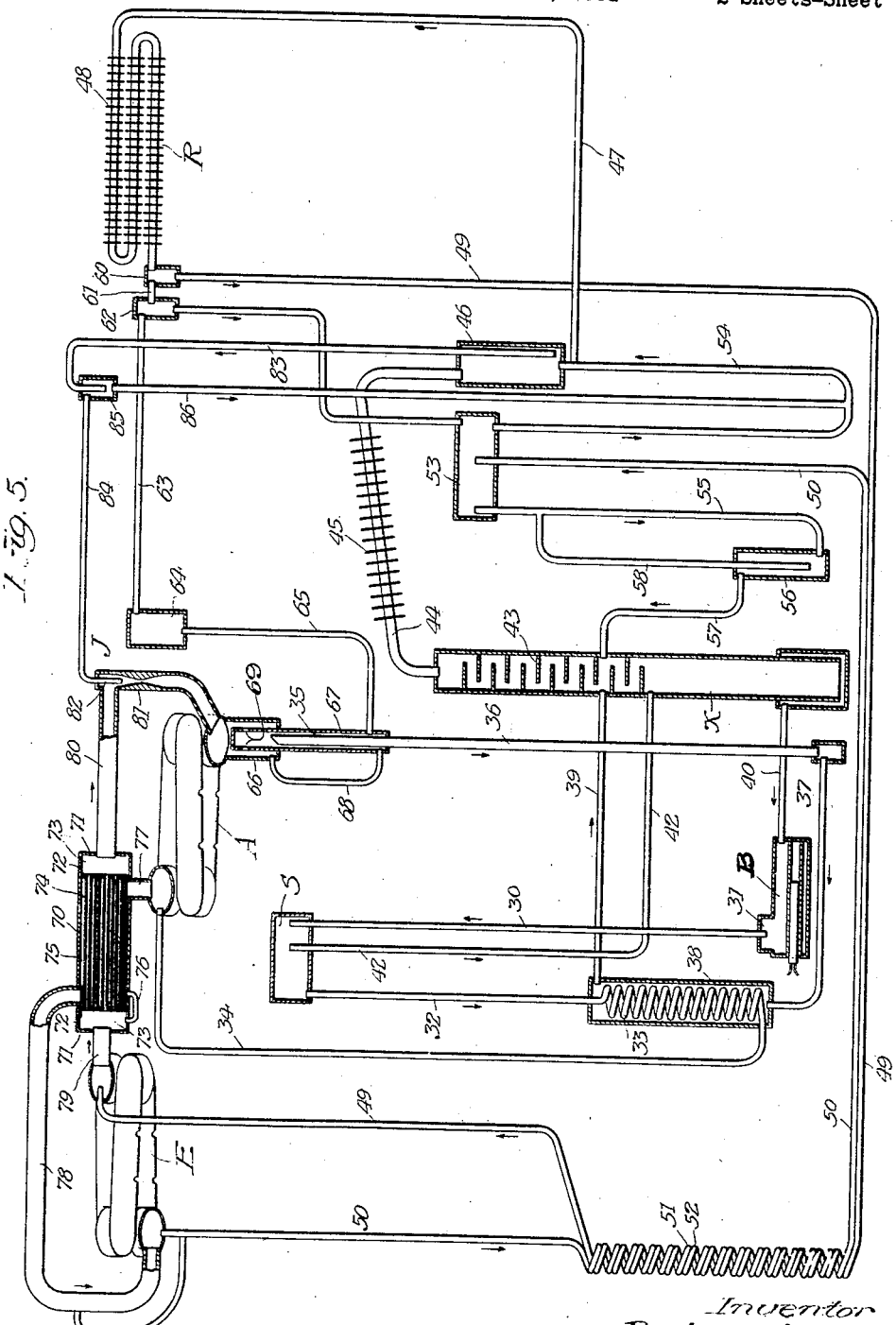

Feb. 14, 1933. R. S. NELSON 1,897,209
ABSORPTION REFRIGERATING APPARATUS
Filed Jan. 14, 1931  2 Sheets-Sheet 1
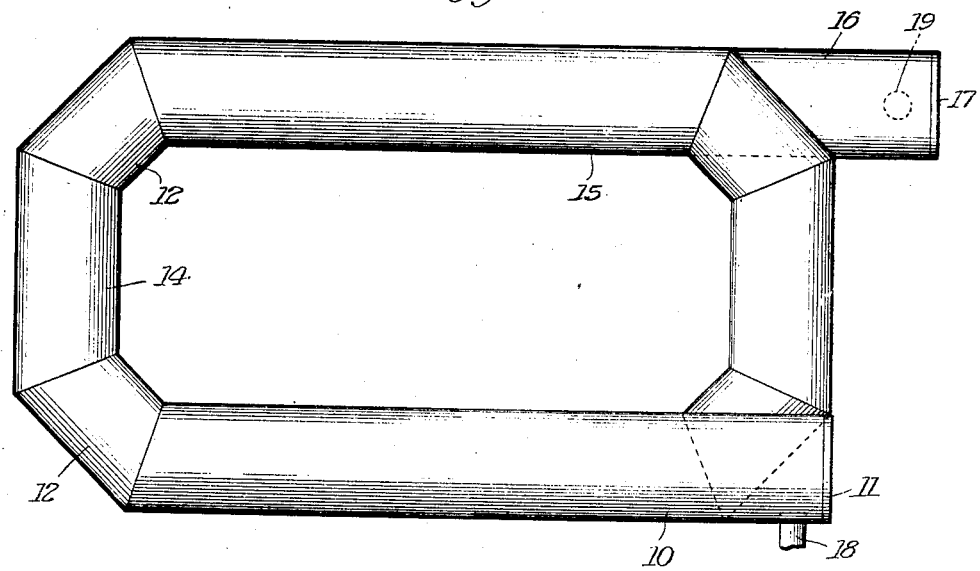
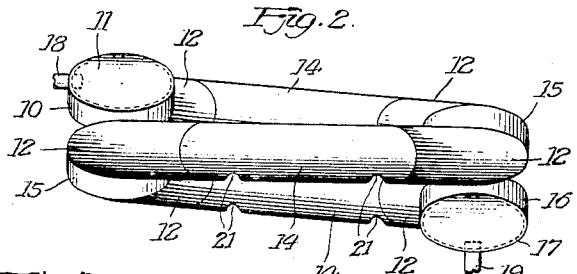
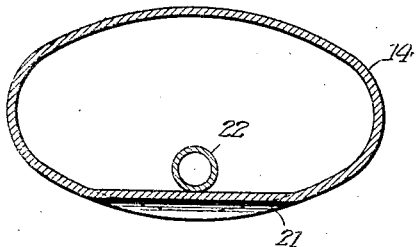 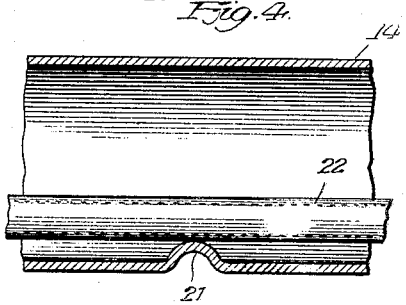
Inventor
Rudolph S. Nelson
By Harry S. Bumarse
Atty.
Witness Feb. 14, 1933. R. S. NELSON 1,897,209
ABSORPTION REFRIGERATING APPARATUS
Filed Jan. 14, 1931 2 Sheets-Sheet 2

Witness
R. B. Davison.

Inventor
Rudolph S. Nelson
By Harry S. Duarse
Atty.

Patented Feb. 14, 1933

1,897,209

UNITED STATES PATENT OFFICE

RUDOLPH S. NELSON, OF ROCKFORD, ILLINOIS, ASSIGNOR TO THE HOOVER COMPANY, OF NORTH CANTON, OHIO, A CORPORATION OF OHIO

ABSORPTION REFRIGERATING APPARATUS

Application filed January 14, 1931. Serial No. 508,572.

This invention relates to absorption refrigerating apparatus and more particularly to the construction of the evaporator and absorber thereof.

In absorption refrigerating apparatus, particularly that of the type in which an inert gas is employed as a pressure equalizing agent, it is desirable to provide an extended surface to promote the evaporation of the refrigerant into the inert gas in the evaporator and to absorb the refrigerant out of the inert gas by bringing it into contact with an absorption liquid in the absorber. It has been customary to provide a series of baffle plates or trays in the evaporator and absorber for this purpose but such constructions are rather expensive and require considerable time in assembling.

An object of the present invention is to provide a simple construction in which no baffles are employed but which nevertheless provides a large surface of contact between the liquids and gases in the evaporator and absorber.

Another object of the invention is to provide an evaporator and absorber of such a shape as to promote the transfer of heat to and from the respective vessels to improve the efficiency of a refrigerating apparatus and to increase its capacity.

Other objects and advantages will be apparent from the following description taken in connection with the accompanying drawings in which, Fig. 1 is a plan view of an evaporator or an absorber constructed in accordance with the principles of the invention, Fig. 2 is an end view thereof, Fig. 3 is a transverse cross sectional view of a piece of pipe which may be used in the construction of the device of Figures 1 and 2, Fig. 4 is a fragmentary longitudinal cross sectional view of the piece of pipe shown in Figure 3 and Fig. 5 is a diagrammatic illustration of the complete absorption refrigeration apparatus in which an evaporator and an absorber, constructed in accordance with the principles of the invention are incorporated, Referring to Figures 1 to 4 of the drawings, a vessel suitable for use as an evaporator or an absorber, is shown as made up of sections of pipes which are elliptical in cross section. It will be understood that the invention is not limited to the use of elliptical shaped pipes but the pipes are preferably of such a shape as to have a large radius of curvature or a flattened portion along the bottom. The various sections of pipe are fitted together so as to form a vessel in the shape of a coil. As shown in Figures 1 and 2 this vessel is made up of a terminal section 10 having a head or closure 11 at one end, a plurality of corner pieces 12, a plurality of end pieces 14, a plurality of side pieces 15 and a terminal section 16 similar to the section 10 and closed at its outer end by a head 17. The corner pieces 12 as well as the end pieces 14 and side pieces 15 are beveled at both ends and sections 10 and 16 have one end beveled so as to permit the various parts to be brought into juxtaposition and be welded together to form a somewhat rectangular shaped coil. As best shown in Figure 2, each part is inclined slightly from the horizontal so as to impart a certain pitch to the coil and provide for the flow of liquid therethru.

A liquid supply pipe 18 may be connected to the section 10 near its upper end and a drain pipe 19 connected to the lower end of the section 16. Provision may also be made for the flow of gas thru the vessel, as will be explained in connection with Figure 5. Gas conduits may be connected to the coil in any suitable manner although they are not shown in Figures 1 to 4.

At suitably spaced points along the pieces 14 and 15, and also on the sections 10 and 16, if desired, a plurality of internal ridges 21 are formed in the bottom. This provides for the formation of pools of liquid and prevents the uninterrupted flow of liquid from one end of the coil to the other. The formation of these internal ridges is best shown in Figures 3 and 4 in which the views may be regarded as cross sectional showings of a portion of the piece 14. The ridges 21 may be formed by striking up portions of the lower wall of the piece 14.

The use of pipe of elliptical cross-section, as shown in Figure 3, has rather marked advantages in that it provides sufficient strength to render it capable of withstanding high internal pressure without distortion while at the same time a large surface is wetted by liquid flowing therethrough. In order to provide a large heat radiating surface from the coil as a whole, the pipe should not be too large and is preferably not more than four inches in diameter along its major axis and one and one-half or two inches as measured along its minor axis. If a vessel of greater volume is desired it is preferable to increase the length of the sections or the number of turns of the coil rather than use a larger size of pipe.

Figures 3 and 4 also illustrate one possible way of cooling the absorber or of transferring heat to the evaporator in case it is desired to use the evaporator in connection with an indirect cooling system. This is shown by the provision of one or more small pipes such as shown at 22 which may be arranged along the bottom of the various pieces or parts making up the coil to provide for the flow of the liquid therethru and cause a quick heat transfer between the liquid therein and the fluids in the coil.

Referring now to Figure 5 a complete refrigerating system of the resorber type is diagrammatically illustrated. In this figure an evaporator constructed as described above is shown at E and an absorber similarly constructed is shown at A. The other parts which go to make up a complete refrigerating system include a boiler B, a combined reservoir and rectifier construction designated X, a gas separating chamber S, a resorber R, a jet construction J and various intermediate vessels and conduits some of which are in heat exchange relation as will appear from the following description. A small pipe 30 connects a dome 31 on the boiler to the gas separating chamber S. This pipe functions as a gas lift pump to lift an absorption liquid from the boiler to the gas separating chamber upon the passage of bubbles of gas in the same direction. The weak solution is conveyed away from the gas separating chamber thru the pipe 32, inner coil 33 of a liquid heat exchanger and into the top of the absorber through the conduit 34. After trickling down thru the absorber, where it picks up refrigerant, the solution passes thru a device 35 called a swallower and flows thru the conduits 36 and 37 to the outer jacket 38 of the liquid heat exchanger and from there through the conduit 39 into the rectifier or analyzer X. From there the solution returns to the boiler thru the conduit 40. The refrigerant gas expelled from the solution in the boiler B passes upwardly thru the gas lift pump 30 and separates from the absorption solution in the gas separating chamber S. It then flows to the rectifier X thru the conduit 42. In passing upwardly over the baffle plates 43 in the rectifier, the refrigerant gas first comes in contact with the absorption solution on some of the lower plates. It then passes thru the inclined pipe 44 which may be provided with a number of heat radiating fins 45 and into the vessel 46 where it comes in contact with the resorber solution. The main resorber circuit includes a small pipe 47 which functions as a gas lift pump, this pipe being connected to the bottom of the chamber 46 just referred to and to the resorber R. The refrigerant gas entering the conduit 47 conveys the resorber solution fed into the pipe 47 to the resorber R. The resorber R may consist of a reversely bent pipe as shown provided with a number of radiating fins 48. In this resorber the refrigerant gas is absorbed forming a strong solution. From the resorber the strong solution flows downwardly through the conduit 49 and over into the top part of the evaporator E. After trickling down through the evaporator in which some of the refrigerant evaporates to produce a cooling effect the resorber solution returns to the pipe 47 at a point just beneath the vessel 46, this path being provided by the conduit 50 connected to the bottom of the evaporator, a vessel 53 and a U-shaped pipe 54. The conduit 50 has a portion 51 arranged in the form of a coil which provides for the exchange of heat with a similarly shaped portion 52 of the pipe 49.

The pipe 55, vessel 56, pipe 57 and pipe 58 connecting the vessel 53 to the rectifier X provide for the return of excess solution which may find its way into the resorber system to the main absorber circuit. The arrangement is such that a liquid seal is maintained between the vessel 53 and the rectifier X, the pipe 58 functioning to return to the vessel 53 any gases which may pass downwardly through the pipe 55. This arrangement is somewhat similar to that of the liquid seal device shown in the patent to Altenkirch 1,772,476, granted August 12, 1930.

It sometimes happens that all of the refrigerant gas conveyed to the resorber is not absorbed in the solution therein, and in an apparatus such as that shown where an inert gas is employed, some inert gas may find its way into the resorber. Provision is therefore made for the passage of these gases from the resorber system to the absorber. This is provided by a small vessel 60, located at the junction of the resorber R and the pipe 49, a small pipe 61, a vessel 62 similar to the vessel 60, a pipe 63, vessel 64 and pipe 65 which is connected to the bottom of the swallower 35 referred to above. This swallower consists of a cylinder 66 connected to the bottom of the absorber A, a somewhat smaller and longer cylinder 67 extending through the bottom part of the cylinder 66, and a small pipe 68 connecting the lower portions of the cylinders together. The upper end of the cylinder 67 is closed except for a number of holes 69 in the walls thereof. The upper end of the conduit 36 is located in the cylinder 67. This end is beveled to prevent the flow of gases downwardly therethrough. Gases entering cylinder 67 of the swallower from the conduit 65 may pass upwardly therethrough and into the absorber through the holes 69 without breaking a liquid seal at this point because liquid may flow downwardly thru the pipe 68 and cause a small local eddy current or cycle between the liquid in the cylinder 66 and that in the cylinder 67.

The evaporator E and absorber A are interconnected by a system of gas conduits and a gas heat exchanger. The heat exchanger is shown as consisting of a cylinder 70 having closed ends or heads 71 and two partitions designated 72 which form chambers 73 near the ends of the cylinder and an intermediate chamber 75. The chambers 73 are connected by a number of tubes 74 which extend thru the partitions 72 and chamber 75. The left hand chamber 73 is connected to the intermediate chamber 75 by a small U-pipe 76 so as to permit the passage of liquid from one to the other, this liquid maintaining a seal for the prevention of the flow of gases from one chamber to the other. The intermediate chamber 75 is connected to the top of the absorber A by the pipe 77 and to the bottom of the evaporator E by the pipe 78. The left hand chamber 73 is connected to the top of the evaporator by the gas conduit 79 while the right hand chamber 73 is connected to the bottom of the absorber by the pipe 80. The latter also contains a Venturi restriction 81 and a small nozzle 82 for causing the flow of gases thru the evaporator and absorber and the conduits mentioned, the Venturi restriction 81 and the nozzle 82 being designated generally as a jet J. A portion of the gas generated in the boiler B is used as an actuating element in supplying the jet J. To this end, conduit 83 connects the chamber 46 to a pipe 84 which feeds the jet, there being a small vessel 85 at the junction between the pipes 83 and 84 and drain pipe 86 therefrom which is connected to the lower portion of the U-shaped pipe 54 so as to effect the delivery of practically dry gas to the jet J.

It is preferable to use ammonia, water and hydrogen as the refrigerant, absorption solution and inert gas in the system shown although the invention is not limited to these fluids. The apparatus will operate satisfactorily at a relatively low pressure even though the resorber R and the absorber A are air cooled since it is not necessary that the refrigerant be condensed before it is fed into the evaporator but only that it be absorbed in the resorber solution.

Various features of the resorber system shown and described herein but not claimed are shown and described and claimed in various pending applications of Edmund Altenkirch as for example, Serial No. 99,890 for "absorption machines" filed April 5, 1926, Serial No. 101,745 for "absorption machines" filed April 13, 1926, Serial No. 141,929 for "absorption machines with automatic circulation of the liquid" filed October 16, 1926 and in various other applications by the same inventor.

While the absorber may be operated as directly air cooled it is preferable to bring a cooling liquid in heat transfer relation with it. One or more pipes like that shown in Figures 3 and 4 may be used for this purpose or the absorber may be provided with a tank or jacket for this purpose. A small pipe or system of pipes located inside of the absorber provides a desirable structure for indirectly air cooling the absorber by means of the cooling systems shown and described in my pending application Serial No. 539,450 filed May 23, 1931 and my pending application Serial No. 527,146 filed April 2, 1931.

In the event that the absorber is operated by air cooling directly it should preferably be provided with heat radiating fins such as are illustrated in connection with the resorber.

From the above description it will be evident that the evaporator and absorber shown present an advantageous structure for providing an extended surface on the inside for effecting the intended changes in the condition or state of the fluids while at the same time providing for a quick transfer of heat. While these devices are shown as forming part of a relatively low pressure resorber system designed to employ an inert gas, it is obvious that they may be employed in systems of an entirely different nature. In fact, because of the relatively small dimensions of the various pieces of pipe which go to make up these vessels, the structure is particularly suitable for use in machines designed to operate at a comparatively high pressure of from 300 to 400 pounds per square inch. It is obvious therefore, that many changes may be made in the arrangement and construction of parts without departing from the spirit of the invention or the scope of the annexed claims.

I claim:—

1. A vessel suitable for use as an evaporator or an absorber of refrigerating apparatus comprising sections of pipe substantially elliptical in cross-section welded together to form a substantially rectangular shaped coil, certain of said sections having spaced transversely extending ridges formed along the bottom to provide for the formation of pools of liquid when the vessel is in use.

2. A vessel suitable for use as an evaporator or an absorber of refrigerating apparatus comprising nearly horizontally disposed sections of straight pipe of non-circular cross-sectional shape secured end to end to form a substantially rectangular shaped coil, each section having a bottom portion formed on a larger radius of curvature than other portions thereof.

3. In refrigerating apparatus, a pair of interconnected vessels constituting an evaporator and an absorber, each of said vessels being composed of straight sections of pipe welded end to end and having means along the bottom thereof for causing the formation of pools of liquid when the apparatus is in use.

4. In refrigerating apparatus, the combination of a pair of vertically disposed coils of pipe constituting an evaporator and an absorber, gas conduits connecting the ends of one coil to the ends of the other, said gas conduits being in heat exchange relation and means for supplying liquids to the upper ends of said coils.

5. In refrigerating apparatus, the combination of a pair of vertically disposed coils of pipe constituting an evaporator and an absorber, gas conduits connecting the ends of one coil to the ends of the other, said gas conduits being in heat exchange relation, means for supplying liquids to the upper ends of said coils and means in said coils for causing the formation of pools of liquid therein when the apparatus is in use.

6. In refrigerating apparatus, the combination of a pair of vertically disposed, substantially rectangular shaped coils of pipe having a substantially elliptical cross-section, said coils constituting an evaporator and an absorber, a gas conduit connecting the lower end of the evaporator coil to the upper end of the absorber coil, a second gas conduit connecting the lower end of the absorber coil to the upper end of the evaporator coil, said gas conduits being in heat exchange relation and means for supplying liquids to the upper ends of said coils.

Signed at North Canton, in the county of Stark, and State of Ohio, this 7th day of January A. D., 1931.

RUDOLPH S. NELSON.